United States Patent [19]
Mineta et al.

[11] Patent Number: 5,723,069
[45] Date of Patent: Mar. 3, 1998

[54] ANTI-FERROELECTRIC LIQUID CRYSTAL COMPOUND AND ANTI-FERROELECTRIC LIQUID CRYSTAL COMPOSITION

[75] Inventors: Hiroshi Mineta; Tomoyuki Yui; Masahiro Johno; Teruyo Tomiyama, all of Tsukaba, Japan

[73] Assignee: Mitsubishi Gas Chemical Company, Inc., Tokyo, Japan

[21] Appl. No.: 767,680

[22] Filed: Dec. 17, 1996

[30] Foreign Application Priority Data

Dec. 18, 1995 [JP] Japan ................... 7-329145

[51] Int. Cl.⁶ .................. C09K 19/20; G02F 1/13; C07C 69/76
[52] U.S. Cl. .................. 252/299.67; 252/299.01; 349/174; 560/65; 560/83
[58] Field of Search .................. 252/299.01, 299.67; 349/174; 560/65, 83

[56] References Cited

U.S. PATENT DOCUMENTS

| | | | |
|---|---|---|---|
| 5,264,150 | 11/1993 | Yui et al. | 252/299.64 |
| 5,340,498 | 8/1994 | Arai et al. | 252/229.65 |
| 5,352,382 | 10/1994 | Johns et al. | 252/299.65 |

FOREIGN PATENT DOCUMENTS

| | | |
|---|---|---|
| 468882A | 1/1992 | European Pat. Off. . |
| 484849A | 5/1992 | European Pat. Off. . |
| 517504A | 12/1992 | European Pat. Off. . |
| 678577A | 10/1995 | European Pat. Off. . |
| 19513258A | 10/1995 | Germany . |
| 1-213390 | 8/1989 | Japan . |
| 1-316339 | 12/1989 | Japan . |
| 1-316367 | 12/1989 | Japan . |
| 1-316372 | 12/1989 | Japan . |
| 2-28128 | 1/1990 | Japan . |
| 5-65486 | 3/1993 | Japan . |
| 6-062872 | 3/1994 | Japan . |
| 1-84536 | 7/1994 | Japan . |

OTHER PUBLICATIONS

N.A. Clark et al, Appl. Phys. Lett. 36(11), Jun. 1, 1980.
A.D.L. Chandani et al, Japanese Journal of Applied Physics, vol. 27, No.5, May. 1988, pp. L729–L732.
A.D.L. Chandani et al, Japanese Journal of Applied Physics, vol. 28, No.7 Jul., 1989, pp. L1261–L1264.
A.D.L. Chandani et al, Japanese Journal of Applied Physics, vol. 28, No.7 Jul., 1989, pp. L1265–L1268.
Masahiro Johno et al, Japanese Journal of Applied Physics, vol. 28, No. 1, Jan., 1989, pp. L119–L120.
Masahiro Johno et al, Japanese Journal of Applied Physics, vol. 29, No. 1, Jan., 1990, pp. L111–L114.
Y. Suzuki et al, Liquid Crystals, 1989, vol. 6, No. 2, pp. 167–174.

*Primary Examiner*—Shean C. Wu
*Attorney, Agent, or Firm*—Sherman and Shalloway

[57] ABSTRACT

An anti-ferroelectric liquid crystal compound of the following general formula (1), and an anti-ferroelectric liquid crystal composition containing it.

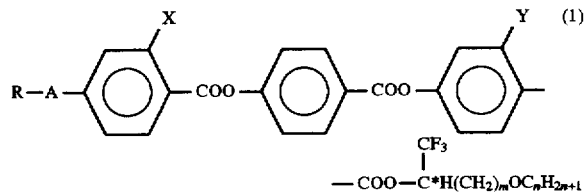

wherein R is a linear alkyl group, A is —O— or —COO—, m is an integer of 5 or greater, n is an integer of 1 to 3, each of X and Y is independently a hydrogen atom or a fluorine atom, and C* is asymmetric carbon.

8 Claims, 1 Drawing Sheet

ANTI-FERROELECTRIC LIQUID CRYSTAL COMPOUND AND ANTI-FERROELECTRIC LIQUID CRYSTAL COMPOSITION

The present invention relates to a novel anti-ferroelectric liquid crystal compound and an anti-ferroelectric liquid crystal composition.

PRIOR ART OF THE INVENTION

Liquid crystal display devices have been and are applied to various small-size display devices due to their operability at low voltages, low power consumption and performance of display with a thin screen. With the recent increases in application and use of liquid crystal display devices to/in the fields of information and office automation-related equipment and television, it is increasingly demanded to develop a high-performance and large-size liquid crystal display device having larger display capacity and higher quality than those of CRT display devices that have been so far available.

However, so long as the currently available nematic liquid crystals are used, it is difficult to increase the device size and decrease the production cost even in an active matrix driven liquid crystal display device (TFT) currently employed for liquid crystal television sets, since the production process is complicated and the yield is low. Further, when the above nematic liquid crystals are applied to a simple matrix driven STN liquid crystal display device (STN), it is not necessarily easy to drive a large-capacity display device, and the decrease in response time is limited, and hence, the video frame rate display is difficult to obtain. At present, therefore, it is difficult to say that the nematic liquid crystal devices that are currently available can satisfy the above demands for achieving high-performance and large-size liquid crystal display device.

As for display quality, further, TFT and STN display devices for which a nematic liquid crystal is adapted have a serious problem that the viewing angle is narrow. Although various proposals have been made to overcome the above problem, it has been difficult to find out drastic measures to overcome the problem so long as a nematic liquid crystal is used.

Under the above circumstances, a liquid crystal display device for which an anti-ferroelectric liquid crystal is adapted is attracting attention as a liquid crystal display device having a fast response time. A surface-stabilized ferroelectric liquid crystal (=SSFLC) device proposed by N. A. Clark and S. T. Lagerwall comes under notice in that it has a remarkably fast response time and a wide viewing angle [N. A. Clark and S. T. Lagerwall. Appl. Phys. Lett. 36, 899 (1980)]. The switching characteristics of this SSFLC device have been detailedly studied, and various ferroelectric liquid crystal compounds have been synthesized to optimize various physical property parameters.

Since, however, the above ferroelectric liquid crystals are insufficient in threshold characteristics, and since their layer forming a ferroelectric phase has a chevron structure, a special design of their liquid crystal alignment is required for achieving a practically acceptable contrast. Furthermore, since the alignment of their liquid crystal molecules is difficult to control, it is difficult to achieve the bistability, which is one of the most important characteristics of SSFLC, with good repeatability. Moreover, it is difficult to restore their alignment when the alignment is destroyed by mechanical shock. It is therefore required to overcome the above problems in order to put their device to practical use.

As described above, attempts have been made in various ways including the development of a new mode for producing a larger-sized and finer-definition liquid crystal display device. Under the circumstances, the development of devices having a switching mechanism which is entirely difference from the prior device is also under way. A switching mechanism in tristable states of a liquid crystal compound having an anti-ferroelectric phase (to be referred to as "anti-ferroelectric liquid crystal compound" hereinafter) is one of these new switching mechanisms (Japanese Journal of Applied Physics, Vol. 27, pp. L729, 1988).

The anti-ferroelectric liquid crystal device has the following three stable states.

That is, it has two uniform states (Ur and Ul) found in a ferroelectric liquid crystal device and a third state. Chandai et al reports that the above third state is an anti-ferroelectric phase (Japanese Journal of Applied Physics, Vol. 28, pp. L1261, 1989, Japanese Journal of Applied Physics, Vol. 28, pp. L1265, 1989).

The first feature of the anti-ferroelectric liquid crystal device is the mechanism of switching among these three stable states. The second feature is that it exhibits a distinct threshold for an applied voltage. Further, the third feature is that it has memory characteristics. These excellent features serve to produce a liquid crystal display device which can exhibit a fast response time and a good contrast.

The anti-ferroelectric liquid crystal device has another important feature in that its layer structure easily undergoes switching by an electric field (Japanese Journal of Applied Physics, Vol. 28, pp. L119, 1989, Japanese Journal of Applied Physics, Vol. 29, pp. L111, 1990).

The above features of the anti-ferroelectric liquid crystal device allow to produce a liquid crystal display device which is almost free of defects, is capable of self-restoring the molecular alignment and is excellent in contrast.

As anti-ferroelectric liquid crystal compounds there are known those disclosed in Japanese Laid-open Patent Publications Nos. 213,390/1989, 316,339/1989, 316,367/1989, 316,372/1989 and 28,128/1990 and Liquid Crystals, Vol. 6, pp. 167, 1989. It is only recently that the studies of anti-ferroelectric liquid crystal compounds have started, and therefore, the number of anti-ferroelectric liquid crystal compounds which are known is not large as compared with ferroelectric liquid crystal compounds, while the number thereof is gradually increasing with the advance in studies thereof.

In practical sense, an anti-ferroelectric liquid crystal compound is desired to have the following characteristics.

(1) The response time is to be as fast as possible for increasing the number of scanning lines (finer definition).

(2) The driving voltage is to be low.

(3) The tilt angle is to be as large as possible for achieving a display with a high brightness.

(4) The anti-ferroelectric phase is to be found in a wide temperature range including and around room temperature.

Generally, use of one liquid crystal compound is difficult to satisfy the above various conditions, and a liquid crystal composition containing a liquid crystal (main component liquid crystal) compound which is excellent in at least one of the above conditions and liquid crystal compound(s) which compensates other characteristics is prepared and used as a practical raw material.

Anti-ferroelectric liquid crystal liquid crystal compounds which have been so far synthesized generally have the following tendency. They have a small tilt angle when they exhibit fast response and a low threshold voltage, while they have a large tilt angle when they exhibit slow response and a high threshold voltage.

Further, many of the anti-ferroelectric liquid crystal compounds have the lower limit of the temperature range of an anti-ferroelectric phase around room temperature.

Generally speaking, it is desirable that a liquid crystal compound satisfy either one of the above conditions (1) and (3) in particular.

The reason therefor is as follows. The threshold voltage can be decreased by incorporating a certain liquid crystal compound as the present inventors disclosed in Japanese Laid-open Patent Publication No. 184,536/1994, and the temperature of the anti-ferroelectric phase can be relatively easily broadened by the method which the present inventors disclosed in Japanese Laid-open Patent Publication No. 65,486/1993.

However, a liquid crystal can be improved concerning the above conditions (1) and (3) to some extent by incorporating an additive, but it is desirable that the liquid crystal originally have properties above a certain level.

The present invention has been made from the above viewpoint, and the present inventors have found that when a phenyl ester having three benzene rings is produced from an optically active alcohol having a trifluoromethyl group on asymmetric carbon and having a terminal alkoxy group, there is obtained an anti-ferroelectric liquid crystal compound which either has a large tilt angle or a fast response time sufficient for use as a main component liquid crystal compound. Further, it has been found that a liquid crystal composition containing the above liquid crystal compound as a main component can give a response speed, tilt angle and temperature range of anti-ferroelectric phase, which are preferred for practical use, and that the liquid crystal composition can be driven at a low voltage. The present invention has been accomplished on the basis of the above finding.

The present invention is directed to an anti-ferroelectric liquid crystal compound of the following general formula (1).

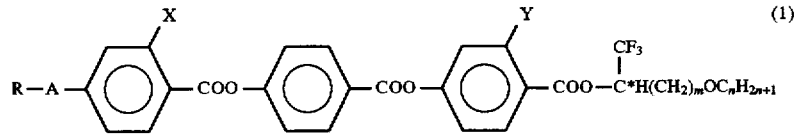

wherein R is a linear alkyl group, A is —O— or —COO—, m is an integer of 5 or greater, n is an integer of 1 to 3, each of X and Y is independently a hydrogen atom or a fluorine atom, and C* is asymmetric carbon.

In the above general formula (1), R is a linear alkyl group, preferably a linear alkyl group having 6 to 10 carbon atoms. m is an integer of 5 or greater, preferably an integer of 5 to 7. n is an integer of 1 to 3, preferably 2.

The compound of the general formula (1) per se, provided by the present invention, can be used as a liquid crystal having anti-ferroelectric characteristics, while it can be prepared as an anti-ferroelectric liquid crystal composition by mixing it with other compound, particularly other anti-ferroelectric liquid crystal compound or other ferroelectric liquid crystal compound for improving the response time, decreasing the driving voltage, improving the tilt angle or broadening the temperature of the anti-ferroelectric phase. Desirably, the content of the anti-ferroelectric liquid crystal compound of the general formula (1) in the above composition is 60 to 90 mol %, preferably 65 to 85 mol %.

The compounds which can be mixed with the above anti-ferroelectric liquid crystal compound are, for example, the following compounds.

According to our finding, for improving the response time, for example, the following compound can be added.

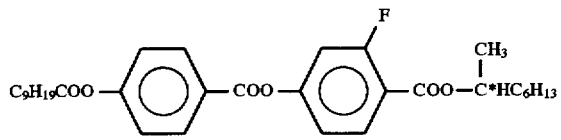

For decreasing the driving voltage, for example, ferrielectric liquid crystal compounds described in Japanese Laid-open Patent Publication No. 184636/1994 can be added. Among those compounds is a compound of

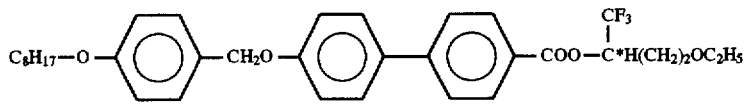

For broadening the temperature range of the anti-ferroelectric phase, for example, liquid crystal compounds described in Japanese Laid-open Patent Publication No. 65486/1993 can be added. Among those compound is a compound of

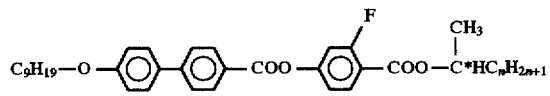

In the present invention, the anti-ferroelectric liquid crystal composition containing the anti-ferroelectric liquid crystal compound of the general formula (1) as a main component is placed between a pair of alignment-treated electrode-attached substrates to form an anti-ferroelectric liquid crystal device.

The optically active alcohol used for the production of the compound of the general formula (1) in the present invention has the chemical structure of $CF_3C*H(OH)(CH_2)_5OC_2H_5$ for example when m is 5 and n is 2. The present inventors have already disclosed the production of the above optically active alcohol in Japanese Laid-open Patent Publication No. 62872/1994. The production thereof is carried out according to the following reaction scheme.

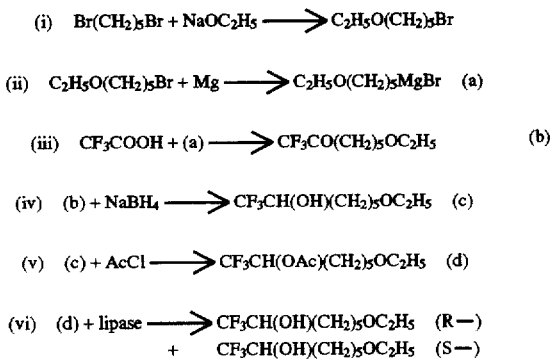

In the above reaction scheme, Ac is an acetyl group. Optically active alcohol other than the compound of the formula (1) in which m is 5 and n is 2 can be also prepared according to a reaction scheme similar to the above.

The present invention can provide a novel anti-ferroelectric liquid crystal compound and an anti-ferroelectric liquid crystal composition. The novel anti-ferroelectric liquid crystal compound provided by the present invention exhibits a fast response time, and the anti-ferroelectric liquid crystal composition containing the said anti-ferroelectric liquid crystal compound concurrently has fast response characteristics, a low threshold voltage, a high tilt angle and a broad temperature range of the anti-ferroelectric phase. Further, the anti-ferroelectric liquid crystal composition can be driven at a low voltage and can be used in a liquid crystal display device utilizing switching among tristable states, distinct threshold voltage properties and good memory performance.

EXAMPLES

Figure 1:
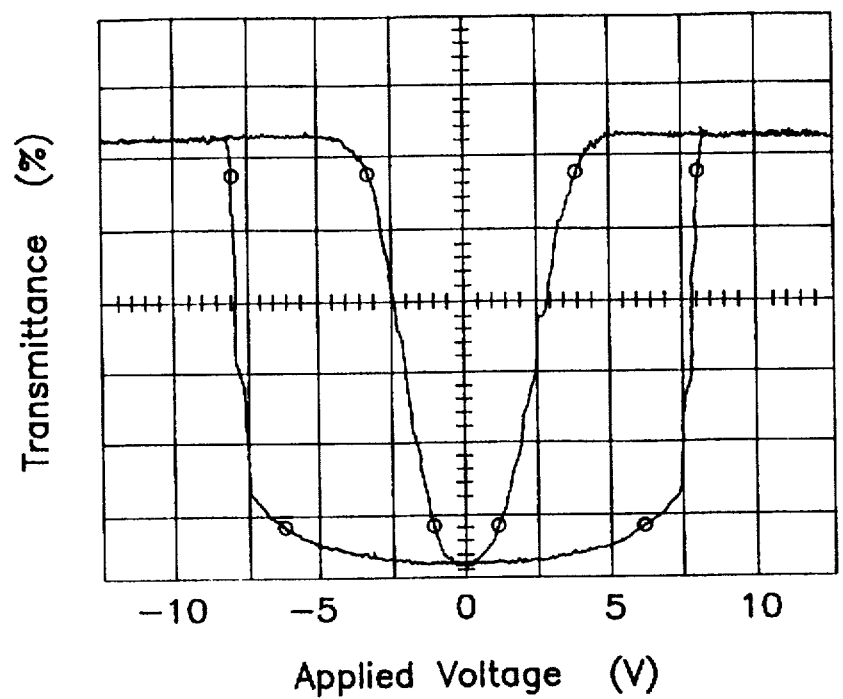
FIG. 1 shows an optical response of when a triangular wave voltage is applied to a liquid crystal compound (AF1) obtained in Example 1.

The present invention will be more specifically explained with reference to Examples and Comparative Examples hereinafter, while the present invention shall not be limited thereto.

Example 1

Preparation of (R)-(+)-3-fluoro-4-(1-trifluoromethyl-6-ethoxyhexyloxycarbonyl)phenyl-4-(4'-n-octyloxyphenyl-carboxyoxy)benzoate (formula (1): R=$C_8H_{17}$, A=O, X=H, Y=F, m=5, n=2 (AF1))

(1) Preparation of p-n-octyloxybenzoic acid

10 Grams of p-hydroxybenzoic acid and 21.7 g of n-octyl bromide were added to a mixture containing 1,500 ml (milliliters) of ethanol and 200 ml of water, and the mixture was allowed to react under reflux for 10 hours. Further, 500 ml of water was added, and the mixture was stirred for 3 hours.

After the completion of the reaction, the reaction mixture was acidified by adding concentrated hydrochloric acid, the solvent was distilled off in an amount of 500 ml, and the residue was cooled to room temperature to give a white solid. The solid was fully washed with water and recrystallized from chloroform to give 13.5 g of an end product (1) in the form of a white crystal.

(2) Preparation of 2-fluoro-4-acetoxybenzoic acid 5.7 Grams of 2-fluoro-4-hydroxybenzoic acid and 8.4 g of anhydrous acetic acid were placed in a two-necked flask and mixed. While the mixture was cooled in water, 5 drops of sulfuric acid was added. After the heat generation terminated, the mixture was heated at 80° C. for 30 minutes.

Then, the reaction mixture was poured into cold water, and a precipitated crystal was recovered by filtration. The crystal was dried under vacuum and used in a subsequent step. The yield thereof was 5.2 g. (3) Preparation of 2-fluoro-4-acetoxy-1-(1-trifluoromethyl-6-ethoxyhexyloxycarbonyl) benzene 1.8 Grams of the 2-fluoro-4-acetoxybenzoic acid was added to 10 ml of thionyl chloride, and the mixture was allowed to react under reflux for 5 hours. Then, excessive thionyl chloride was distilled off, and then a mixture containing 1 ml of pyridine, 4 ml of dry ether and 1.8 g of (R)-(+)-7-ethoxy-1,1,1-trifluoro-heptan-2-ol was dropwise added.

After the addition, the mixture was stirred at room temperature for 1 day and diluted with 200 ml of ether, and an organic layer was washed with diluted hydrochloric acid, with a 1N sodium hydroxide aqueous solution and with water in this order, and dried over magnesium sulfate. The solvent was distilled off, and the residue was purified by silica gel column chromatography using hexane/ethyl acetate as a solvent, to give 2.1 g of an end product.

(4) Preparation of 2-fluoro-4-hydroxy-1-(1-trifluoromethyl-6-ethoxyhexyloxycarbonyl)benzene 1.0 Gram of the compound obtained in the above (3) was dissolved in 30 ml of ethanol, and 3 g of benzylamine was dropwise added. Further, the mixture was stirred at room temperature for 1 day, then diluted with 300 ml of ether, washed with diluted hydrochloric acid and with water in this order, and dried over magnesium sulfate. The solvent was distilled off, and the residue was subjected to silica gel column chromatography for isolation and purification to give 0.50 g of an end product.

(5) Preparation of 4-octyloxybenzoic acid chloride

A large excess of thionyl chloride was added to 10 g of the p-octyloxybenzoic acid prepared in (1), and the mixture was refluxed for 5 hours. Excessive thionyl chloride was distilled off to give a crude end compound.

(6) Preparation of 4-octyloxyphenylcarboxyoxybenzoic acid

8 Grams of the p-octyloxybenzoic acid chloride prepared in (5), 7.3 g of p-hydroxybenzoic acid and 5.7 g of triethylamine were dissolved in 100 ml of dichloromethane, and 1.8 g of dimethylaminopyridine was added. The mixture was stirred at room temperature for 1 day. 1N hydrochloric acid was added to the reaction mixture, an organic layer was separated, and the solvent was distilled off. The resultant crude product re-crystallized from ethanol, to give 2.9 g of an end product.

(7) Preparation of 4-octyloxyphenylcarboxyoxybenzoic acid chloride

A large excess of thionyl chloride was added to 2.0 g of the 4-octyloxyphenylcarboxyoxybenzoic acid obtained in (6), and the mixture was refluxed for 5 hours. Excessive thionyl chloride was distilled off, to give a crude end compound.

(8) Preparation of (R)-(+)-3-fluoro-4-(1-trifluoromethyl-6-ethoxyhexyloxycarbonyl)phenyl-4-(4'-n-octyloxyphenylcarboxyloxy)benzoate 0.8 Gram of the crude benzoic acid chloride obtained in (7) and 0.7 g of the phenol derivative obtained in (4) were dissolved in 25 ml of toluene, 3 ml of pyridine was added, and the mixture was stirred at room temperature for 1 day.

The reaction mixture was diluted with 150 ml of dichloromethane, consecutively washed with a 1N hydrochloric acid aqueous solution, with a 1N sodium hydroxide aqueous solution and with water and dried over anhydrous sodium sulfate, and the solvent was distilled off. The resultant crude product was purified by silica gel column chromatography (hexane/ethyl acetate =9/1) to give 0.7 g of the intended liquid crystal compound.

Example 2

Preparation of (R)-(+)-3-fluoro-4-(1-trifluoromethyl-6-ethoxyhexyloxycarbonyl)phenyl-4-(4'-n-hexyloxyphenyl-carboxyoxy)benzoate (formula (1): $R=C_6H_{13}$, $A=O$, $X=H$, $Y=F$, $m=5$, $n=2$ (AF2))

The intended product was obtained in the same manner as in Example 1 except that the p-octyloxybenzoic acid was replaced with p-hexyloxybenzoic acid.

The spectrum data of the compounds AF1 and AF2 obtained in Examples 1 and 2 are shown below.

90%. A length of time which is required for the transmittance reaching 90% from 10% when an anti-ferroelectric phase is shifted to an ferroelectric phase is defined as response time I, and a length of time which is required for the transmittance reaching 10% from 90% when an ferroelectric phase is shifted to an anti-ferroelectric phase is defined as response time II. The smaller the response time I is, the more preferred it is. The response time II is set for a proper length of time by a driving method.

Further, the above voltage was applied, and each sample was turned until a dark field appeared. The tilt angle (θ) was determined on the basis of the turning angle when the black state was observed by rotation of the sample.

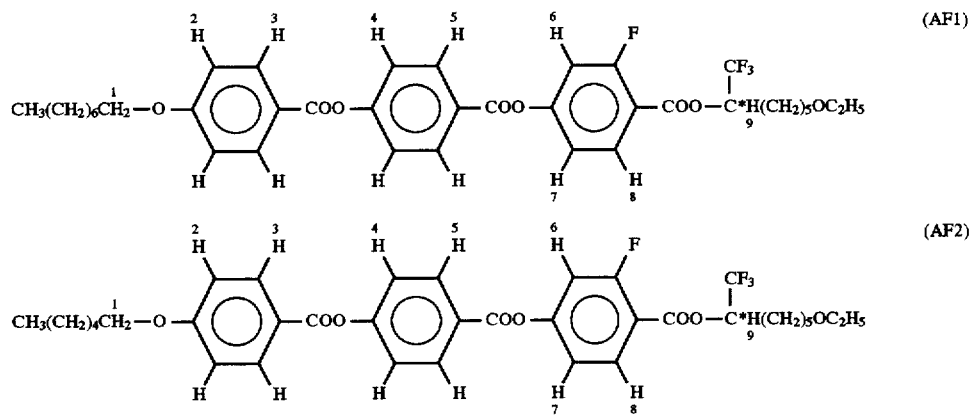

The phases of compounds were identified on the basis of texture observation and DSC (Differential Scanning Calorimetry). Table 2 shows the results.

The compounds were measured for a response time and a tilt angle, and Table 3 shows the results. Table 3 shows that the anti-ferroelectric livid crystal compounds AF1 and AF2 exhibited a remarkably fast response time. Further, the compound AF1 showed a large tilt angle, while the compound AF2 showed a somewhat small tilt angle.

The response time and the tilt angle were measured as follows.

An ITO-electrodes-attached liquid crystal cell (cell thickness 2 μm) having a rubbing-treated polyimide thin film was charged with the above liquid crystal compound in an isotropic state. The cell was gradually cooled at a rate of 1.0° C./minute to align the liquid crystal. The cell was placed between the crossed polarizers such that the layer direction of the liquid crystal was in parallel with an analyzer or a polarizer. A triangular wave voltage of ±35 V at a frequency of 0.5 Hz was applied to the liquid crystal cell. A photomultiplyer was used for the measurement of a change in transmittance of light.

FIG. 1 shows the results of measurement of AF1 obtained in Example 1.

AF1 showed a response history of double hysterisis characteristic of an anti-ferroelectric phase in a temperature range of 89° C. to 30° C.

In FIG. 1, the minimum and the maximum of light transmittance are defined to be 0% and 100%. Points indicated by ○ in FIG. 1 show that the transmittance is 10% or

TABLE 1

| Code of hydrogen atom | 1H | 2H | 3H | 4H | 5H | 6H | 7H | 8H | 9H |
|---|---|---|---|---|---|---|---|---|---|
| AF1 (δ, ppm) | 4.1 | 7.0 | 8.1 | 7.4 | 8.6 | 7.7 | 7.7 | 8.2 | 5.6 |
| AF2 | 4.1 | 7.0 | 8.1 | 7.4 | 8.6 | 7.7 | 7.7 | 8.2 | 5.6 |

TABLE 2

| | Phase sequence |
|---|---|
| AF1 | I(97)SA(89)SCA*(30)Cr |
| AF2 | I(107)SA(92)SCA*(<−10)Cr |

In the above phase sequences, I stands for an isotropic phase, SA stands for a smectic A phase, SCA* stands for anti-ferroelectric smectic C phase, and Cr stands for a crystal phase.

TABLE 3

| | Response time I | Response time II | θ(°) | Measurement temperature(°C.) |
|---|---|---|---|---|
| AF1 | 34 | 1021 | 34 | 35 |
| AF2 | 43 | 600 | 30 | 30 |

Response time I: Time required for the transmittance reaching 90% from 10% when a liquid crystal transits from an anti-ferroelectric state to a ferroelectric state (unit: μs)

Response time II: Time required for the transmittance reaching 10% from 90% when a liquid crystal transits from a ferroelectric state to an anti-ferroelectric state (unit: μs)

Example 3

Preparation of (R)-(+)-3-fluoro-4-(1-trifluoromethyl-6-ethoxyhexyloxycarbonyl)phenyl-4-(4'-decanoyloxyphenylcarboxyoxy)benzoate (formula (1): R=C$_9$H$_{19}$, A=COO, X=H, Y=F, m=5, n=2 (AF3))

(1) Preparation of p-decanoyloxybenzoic acid

10 Grams of p-hydroxybenzoic acid and 15 g of decanoic acid chloride were stirred at room temperature, and 7.2 g of pyridine was dropwise added. After the mixture was stirred for 1 day, a reaction product was poured into water, and an organic layer was extracted with dichloromethane. The organic layer was washed with 1N hydrochloric acid and dried over anhydrous sodium sulfate, the solvent was distilled off, and then residue was washed with n-hexane and then dried to give a crude end product.

(2) Preparation of p-decanoyloxybenzoic acid chloride

A large excess of thionyl chloride was added to 5 g of the p-decanoyloxybenzoic acid obtained in (1), and the mixture was refluxed for 5 hours. Then, excessive thionyl chloride was distilled off to give crude p-decanoyloxybenzoic acid chloride.

(3) Preparation of (R)-(+)-3-fluoro-4-(1-trifluoromethyl-6-ethoxyhexyloxycarbonylphenyl-4'-acetoxyphenylbenzoate p-Acetoxybenzoic acid was prepared in the same manner as in Example 1(2) except that the 2-fluoro-4-hydroxybenzoic acid was replaced with p-hydroxybenzoic acid. The p-hydroxybenzoic acid was chlorinated in the same manner as in the above (2), to obtain an acid chloride. 1.8 Grams of the acid chloride and 2 g of the (R)-(+)-2-fluoro-4-hydroxy-1-(1-trifluoromethyl-6-ethoxyhexyloxycarbonyl)benzene obtained in Example 1 were dissolved in 50 ml of toluene, 6 ml of pyridine was added, and the mixture was stirred for 1 day. The reaction mixture was poured into water, consecutively washed with a hydrochloric acid aqueous solution, with a sodium hydroxide aqueous solution and with water, and dried over anhydrous sodium sulfate, and the solvent was distilled off to give a crude product. The crude product was purified by silica gel column chromatography(eluting solvent: ethyl acetate/hexane=15/85), to give 2.8 g of an end product.

(4) Preparation of (R)-(+)-3-fluoro-4-(1-trifluoromethyl-6-ethoxyhexyloxycarbonylphenyl-4'-hydroxyphenylbenzoate 2.8 Grams of the (R)-(+)-3-fluoro-4-(1-trifluoromethyl-6-ethoxyhexyloxycarbonylphenyl-4'-acetoxyphenylbenzoate obtained in (3) was dissolved in 60 ml of ethanol, 1.2 g of benzylamine was added, and the mixture was stirred for 1 day. The reaction mixture was poured into water and subjected to extraction with dichloromethane, and an organic layer was consecutively washed with a hydrochloric acid aqueous solution, with a sodium hydroxide aqueous solution and with water. The organic layer was dried over anhydrous sodium sulfate, and the solvent was distilled off to give a crude product. The crude product was purified by silica gel column chromatography (ethylacetate/hexane=1/3), to give 1.2 g of an end product.

(5) Preparation of (R)-(+)-3-fluoro-4-(1-trifluoromethyl-6-ethoxyhexyloxycarbonyl)phenyl-4-(4'-n-decanoyloxyphenylcarboxyoxy)benzoate 0.65 Gram of the (R)-(+)-3-fluoro-4-(1-trifluoromethyl-6-ethoxyhexyloxycarbonylphenyl-4'-hydroxyphenylbenzoate obtained in (4) and 0.71 g of the p-decanoyloxybenzoic acid chloride obtained in (2) were dissolved in 25 ml of toluene, 3 ml of pyridine was added, and the mixture was stirred at room temperature for 1 day. The reaction mixture was poured into water and subjected to extraction with dichloromethane, and an organic layer was consecutively washed with a hydrochloric acid aqueous solution, with a sodium hydroxide aqueous solution and with water. The organic layer was dried over anhydrous sodium sulfate, and then the solvent was distilled off to give a crude product. The crude product was purified by silica gel column chromatography (ethyl acetate/hexane=1/9), to give 0.7 g of an end product.

Example 4

Preparation of (R)-(+)-4-(1-trifluoromethyl-6-ethoxyhexyloxycarbonyl)phenyl-4-(4'-n-decanoyloxyphenylcarboxyoxy)benzoate (formula (1): R=C$_9$H$_{19}$, A=COO, X=H, Y=H, m=5, n=2 (AF4))

The intended product was prepared in the same manner as in Example 3 except that the (R)-(+)-2-fluoro-4-hydroxy-1-(1-trifluoromethyl-6-ethoxyhexyloxycarbonyl)benzene was replaced with (R)-(+)-4-hydroxy-1-(1-trifluoromethyl-6-ethoxyhexyloxycarbonyl)benzene.

Example 5

Preparation of (R)-(+)-4-(1-trifluoromethyl-6-ethoxyhexyloxycarbonyl)phenyl-4-(4'-n-nonanoyloxyphenylcarboxyoxy)benzoate (formula (1): R=C$_8$H$_{17}$, A=COO, X=H, Y=H, m=5, n=2 (AF5))

The intended product was prepared in the same manner as in Example 4 except that the p-decanoyloxybenzoic acid was replaced with p-nonanoyloxybenzoic acid.

Example 6

Preparation of (R)-(+)-4-(1-trifluoromethyl-6-ethoxyhexyloxycarbonyl)phenyl-4-(2'-fluoro-4'-n-decanoyloxyphenylcarboxyoxy)benzoate (formula (1): R=C$_9$H$_{19}$, A=COO, X=F, Y=H, m=5, n=2 (AF6))

The intended product was prepared in the same manner as in Example 3 except that the p-decanoyloxybenzoic acid was replaced with 2-fluoro-4-decanoyloxybenzoic acid.

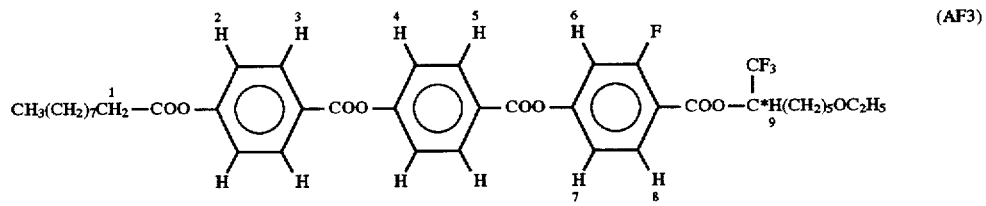

(AF3)

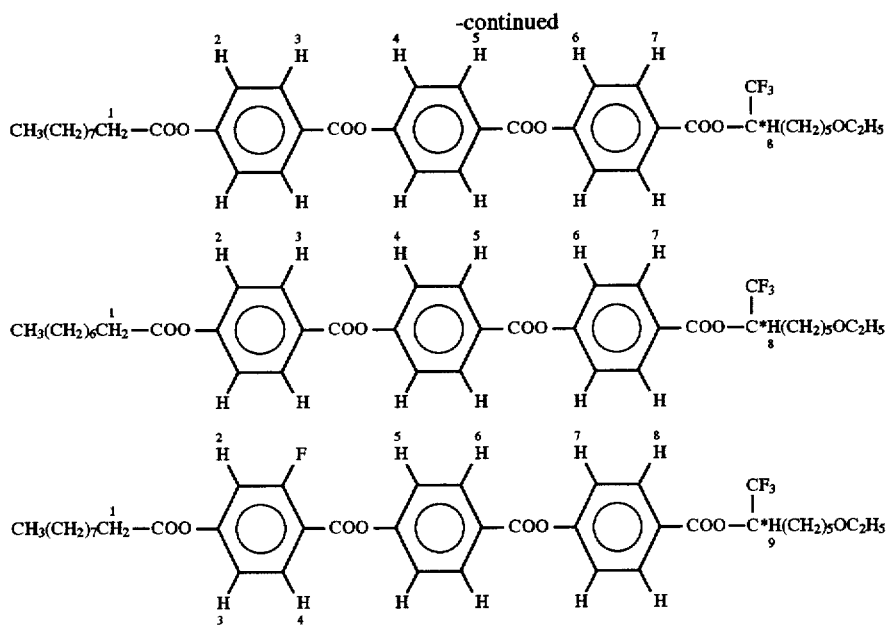

TABLE 4

| Code of hydrogen atom | 1H | 2H | 3H | 4H | 5H | 6H | 7H | 8H | 9H |
|---|---|---|---|---|---|---|---|---|---|
| AF3 (δ, ppm) | 2.6 | 7.4 | 8.3 | 7.4 | 8.3 | 7.2 | 7.2 | 8.1 | 5.6 |
| AF4 | 2.6 | 7.0 | 8.1 | 7.4 | 8.6 | 7.2 | 8.4 | 5.6 | |
| AF5 | 2.6 | 7.0 | 8.1 | 7.4 | 8.6 | 7.2 | 8.4 | 5.6 | |
| AF6 | 2.6 | 7.1 | 7.2 | 8.2 | 7.4 | 8.1 | 7.4 | 8.3 | 5.6 |

TABLE 5

| | Phase sequence |
|---|---|
| AF3 | I(92)SA(84)SCA*(<0)Cr |
| AF4 | I(96)SA(78)SCA*(10)Cr |
| AF5 | I(95)SA(73)SCA*(38)Cr |
| AF6 | I(89)SA(63)SCA*(-17)Cr |

In the above phase sequences, I stands for an isotropic phase, SA stands for a smectic A phase, SCA* stands for an anti-ferroelectric smectic C phase, and Cr stands for a crystal phase.

TABLE 6

| | Response time I | Response time II | θ(°) | Measurement temperature(°C.) |
|---|---|---|---|---|
| AF3 | 57 | 3525 | 36 | 30 |
| AF4 | 35 | 247 | 30 | 30 |
| AF5 | 12 | 275 | 26 | 45 |
| AF6 | 33 | 124 | 25 | 30 |

Response time I: Time required for the transmittance reaching 90% from 10% when a liquid crystal transits from an anti-ferroelectric state to a ferroelectric state (unit: μs)
Response time II: Time required for the transmittance reaching 10% from 90% when a liquid crystal transits from a ferroelectric state to an anti-ferroelectric state (unit: μs)

Example 7

A liquid crystal composition was prepared by mixing the liquid crystal compound (AF3) obtained in Example 3 with 30 mol % of an anti-ferroelectric liquid crystal compound (A) having the following chemical formula.

Liquid crystal compound A:

$C_9H_{19}O$—Ph—Ph—COO—Ph(3F)—COO—C*H(CF$_3$)(CH$_2$)$_5$OC$_2$H$_5$ wherein Ph is a 1,4-phenylene group, Ph(3F) is a 1,4-phenylene group in which F is substituted on the 3-position (ortho position relative to —COO— on the asymmetric carbon side, and C* is asymmetric carbon.

The liquid crystal compound A and the obtained liquid crystal composition were measured for phase sequences, response times and tilt angles, and Tables 7 and 8 show the results.

The compound obtained in Example 3 had a large tilt angle but had a somewhat long response time, and the lower limit of the temperature range of the anti-ferroelectric phase was about 0° C. The use thereof alone was therefore difficult. On the other hand, the liquid crystal compound A had excellent properties concerning the tilt angle and the response time, while it showed poor alignment since it had no smectic A phase as a crystal phase. The use thereof alone was therefore difficult. When those two liquid crystal compounds having the above defects were mixed in the above-described mixing ratio, the resultant liquid crystal composition was well-balanced among the liquid crystal sequence, the response time and the tilt angle.

TABLE 7

| | Phase sequence |
|---|---|
| Ex. 7 | I(85)SA(78)SC γ*(74)SCA*(<-10)Cr |
| L.c.A. | I(83)SC*(77)SCA*(<-50)Cr |

(Ex. 7 = Example 7, L.c.A. = Liquid crystal A)

In the above phase sequences, I is an isotropic phase, SA is a smectic A phase, SC γ* is a ferroelectric phase, SC* is a chiral smectic C phase (ferroelectric phase), SCA* is an anti-ferroelectric smectic C phase, and Cr is a crystal phase.

TABLE 8

| | Response time I | Response time II | θ(°) | Measurement temperature(°C.) |
|---|---|---|---|---|
| Ex. 7 | 39 | 1345 | 36 | 30 |
| L.c.A. | 21 | 745 | 37 | 30 |

(Ex. 7 = Example 7, L.c.A. = Liquid crystal A)

Response time I: Time required for the transmittance reaching 90% from 10% when a liquid crystal transits from an anti-ferroelectric state to a ferroelectric state (unit: μs)
Response time II: Time required for the transmittance reaching 10% from 90% when a liquid crystal transits from a ferroelectric state to an anti-ferroelectric state (unit: μs)

Example 8

A liquid crystal composition was prepared by mixing the liquid crystal compound (AF2) obtained in Example 2 with 20 mol % of an anti-ferroelectric liquid crystal compound (B) having the following chemical formula.

Liquid crystal compound B:

$C_9H_{19}O$—Ph—Ph—COO—Ph(3F)—COO—C*H(CF$_3$)(CH$_2$)$_3$OC$_2$H$_5$ wherein Ph, Ph(3F) and C* are as defined in the formula of the liquid crystal compound A.

The liquid crystal compound B and the obtained liquid crystal composition were measured for phase sequences, response times and tilt angles, and Tables 9 and 10 show the results.

The compound obtained in Example 2 had a somewhat small tilt angle and a somewhat long response time. However, the composition obtained by mixing it with the liquid crystal compound B was improved in the response time and the tilt angle and was therefore preferred as a practical liquid crystal material.

TABLE 9

| | Phase sequence |
|---|---|
| Ex. 8 | I(104)SA(90)SCA*(<−10)Cr |
| L.c.B | I(103)SA(102)SC γ*(<0)Cr |

(Ex. 8 = Example 8, L.c.B = Liquid crystal B)

TABLE 9

| | Response time I | Response time II | θ(°) | Measurement temperature(°C.) |
|---|---|---|---|---|
| Ex. 8 | 33 | 1135 | 33 | 30 |
| L.c.B | 21 | 430 | 38 | 30 |

(Ex. 8 = Example 8, L.c.B = Liquid crystal B)

Notes: Response time I and response time II in Example 8 are as defined in the note to Table 8.

*1: The response time I and the response time II of the liquid crystal compound B were as follows.

The liquid crystal compound B was a ferrielectric liquid crystal, and it was therefore placed in a cell coated with SiO$_2$ as an insulating film and its response time was measured at a charged voltage of 8 V.

In the above case, the response time I was a time (unit: μs) required for the transmittance reaching 90% from 10% when a liquid crystal phase-transits from a ferrielectric state to a ferroelectric state, and the response time II was a length of time (unit: μs) required for the transmittance reaching 10% from 90% when a liquid crystal phase-transits from a ferroelectric state to a ferrielectric state.

What is claimed is:

1. An anti-ferroelectric liquid crystal compound of the following general formula (1),

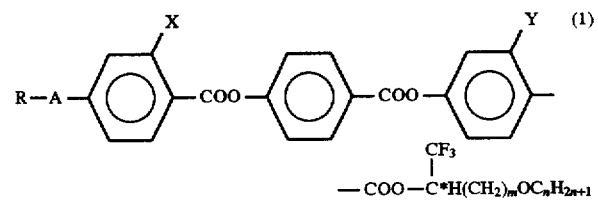

wherein R is a linear alkyl group having 6 to 10 carbon atoms, A is —O— or —COO—, m is an integer of 5 or greater, n is an integer of 1 to 3, each of X and Y is independently a hydrogen atom or a fluorine atom, and C* is asymmetric carbon.

2. The anti-ferroelectric liquid crystal compound of claim 1, wherein m in the general formula (1) is an integer of 5 to 7.

3. The anti-ferroelectric liquid crystal compound of claim 1, wherein n in the general formula (1) is 2.

4. An anti-ferroelectric liquid crystal composition containing, as a main component, the anti-ferroelectric liquid crystal compound of claim 1.

5. The anti-ferroelectric liquid crystal composition of claim 4, wherein the anti-ferroelectric liquid crystal composition contains 60 to 90 mol % of the anti-ferroelectric liquid crystal compound.

6. An anti-ferroelectric liquid crystal device formed by placing the anti-ferroelectric liquid crystal composition of claim 5 between a pair of alignment-treated, electrodes-attached substrates.

7. The anti-ferroelectric liquid crystal compound of claim 1, wherein A is —O—, M is an integer of 5 to 7 and n is an integer of 2.

8. The anti-ferroelectric liquid crystal compound of claim 1 wherein A is —COO—, M is an integer of 5 to 7 and n is an integer 2.

* * * * *